(12) United States Patent
Kimura

(10) Patent No.: US 11,144,777 B2
(45) Date of Patent: Oct. 12, 2021

(54) IMAGE PROCESSING APPARATUS, IMAGE PROCESSING METHOD, AND IMAGE PROCESSING PROGRAM FOR CLIPPING IMAGES INCLUDED IN A LARGE IMAGE

(71) Applicant: Rakuten Group, Inc., Tokyo (JP)

(72) Inventor: Daiki Kimura, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 117 days.

(21) Appl. No.: 16/313,753

(22) PCT Filed: Jun. 30, 2016

(86) PCT No.: PCT/JP2016/069489
§ 371 (c)(1),
(2) Date: Dec. 27, 2018

(87) PCT Pub. No.: WO2018/003074
PCT Pub. Date: Jan. 4, 2018

(65) Prior Publication Data
US 2020/0184249 A1 Jun. 11, 2020

(51) Int. Cl.
*G06K 9/32* (2006.01)
*G06K 9/46* (2006.01)
(Continued)

(52) U.S. Cl.
CPC ............. *G06K 9/34* (2013.01); *G06K 9/3241* (2013.01); *G06K 9/4604* (2013.01); *G06K 9/50* (2013.01); *G06T 5/006* (2013.01); *G06T 7/60* (2013.01)

(58) Field of Classification Search
CPC ...... G06K 9/3241; G06K 9/34; G06K 9/4604; G06K 9/50; G06T 5/006; G06T 7/40; G06T 7/60; H04N 1/387
See application file for complete search history.

(56) References Cited

U.S. PATENT DOCUMENTS 5,689,342 A * 11/1997 Nakatsuka ......... G06K 9/00442
358/296
5,757,957 A * 5/1998 Tachikawa ............. G06K 9/346
358/462

(Continued)

FOREIGN PATENT DOCUMENTS

JP 2008-219928 A 9/2008
JP 2010-074368 A 4/2010

OTHER PUBLICATIONS

Linker, Raphael, Oded Cohen, and Amos Naor. "Determination of the number of green apples in RGB images recorded in orchards." Computers and Electronics in Agriculture 81 (2012): 45-57. (Year: 2012).*

(Continued)

*Primary Examiner* — Randolph I Chu
(74) *Attorney, Agent, or Firm* — Sughrue Mion, PLLC

(57) ABSTRACT

The apparatus includes an image data obtainer, a candidate region extractor, a candidate line extractor, an overlap degree determiner, and a clip image region extractor. The candidate region extractor extracts, as a candidate region, a region containing an object detectable from the image data. The candidate line extractor extracts, as a candidate line, a line that is at least either a line segment or an arc included in the image data. The overlap degree determiner determines whether the degree of overlap between a closed line forming the outline of the candidate region extracted and the candidate line extracted is greater than or equal to a preset predetermined first percentage value. If the overlap degree determiner determines that the degree of overlap is greater than or equal to the first percentage value, the clip image region extractor 19 extracts the candidate region as a clip image.

10 Claims, 13 Drawing Sheets

(51) Int. Cl.
*G06K 9/34* (2006.01)
*G06K 9/50* (2006.01)
*G06T 5/00* (2006.01)
*G06T 7/60* (2017.01)

(56) References Cited

U.S. PATENT DOCUMENTS

| | | | | |
|---|---|---|---|---|
| 5,848,186 | A * | 12/1998 | Wang | G06K 9/00463 382/176 |
| 7,536,026 | B2 * | 5/2009 | Kaneda | G06T 1/0028 340/5.86 |
| 7,876,471 | B2 * | 1/2011 | Tojo | G06F 16/50 358/1.18 |
| 8,467,606 | B2 * | 6/2013 | Barton | G06T 7/12 382/173 |
| 9,922,400 | B2 * | 3/2018 | Kashibuchi | G06K 9/00456 |
| 2004/0247206 | A1 * | 12/2004 | Kaneda | G06F 16/56 382/305 |
| 2008/0100624 | A1 * | 5/2008 | Matsunaga | G06T 11/203 345/469.1 |
| 2009/0190830 | A1 * | 7/2009 | Hasegawa | G06K 9/00456 382/165 |
| 2009/0245641 | A1 * | 10/2009 | Konno | G06F 40/103 382/176 |
| 2010/0174985 | A1 * | 7/2010 | Levy | G06F 40/106 715/244 |
| 2013/0014007 | A1 * | 1/2013 | Kopp | G06F 40/106 715/243 |
| 2013/0022255 | A1 * | 1/2013 | Chen | G06T 7/149 382/131 |
| 2013/0051671 | A1 * | 2/2013 | Barton | G06T 7/12 382/173 |
| 2014/0294303 | A1 * | 10/2014 | Kawatani | G06T 7/12 382/180 |
| 2015/0067484 | A1 * | 3/2015 | Sumio | G06F 40/106 715/251 |
| 2016/0063323 | A1 * | 3/2016 | Isupov | G06K 9/00476 382/200 |
| 2017/0083762 | A1 * | 3/2017 | Segalovitz | G06K 9/00463 |
| 2017/0154025 | A1 * | 6/2017 | Dejean | G06F 40/197 |

OTHER PUBLICATIONS

Larsen, P. A., J. B. Rawlings, and N. J. Ferrier. "Model-based object recognition to measure crystal size and shape distributions from in situ video images." Chemical Engineering Science 62.5 (2007): 1430-1441. (Year: 2007).*

Joe Carreira et al., "Constrained Parametric Min-Cuts for Automatic Object Segmentation", [online] Jun. 4, 2014, 8 pgs., URL:http://www.eecs.berkeley.edu/~carreira/papers/cvpr2010_2.pdf.

International Search Report for PCT/JP2016/069489 dated Sep. 20, 2016 (PCT/ISA/210).

* cited by examiner

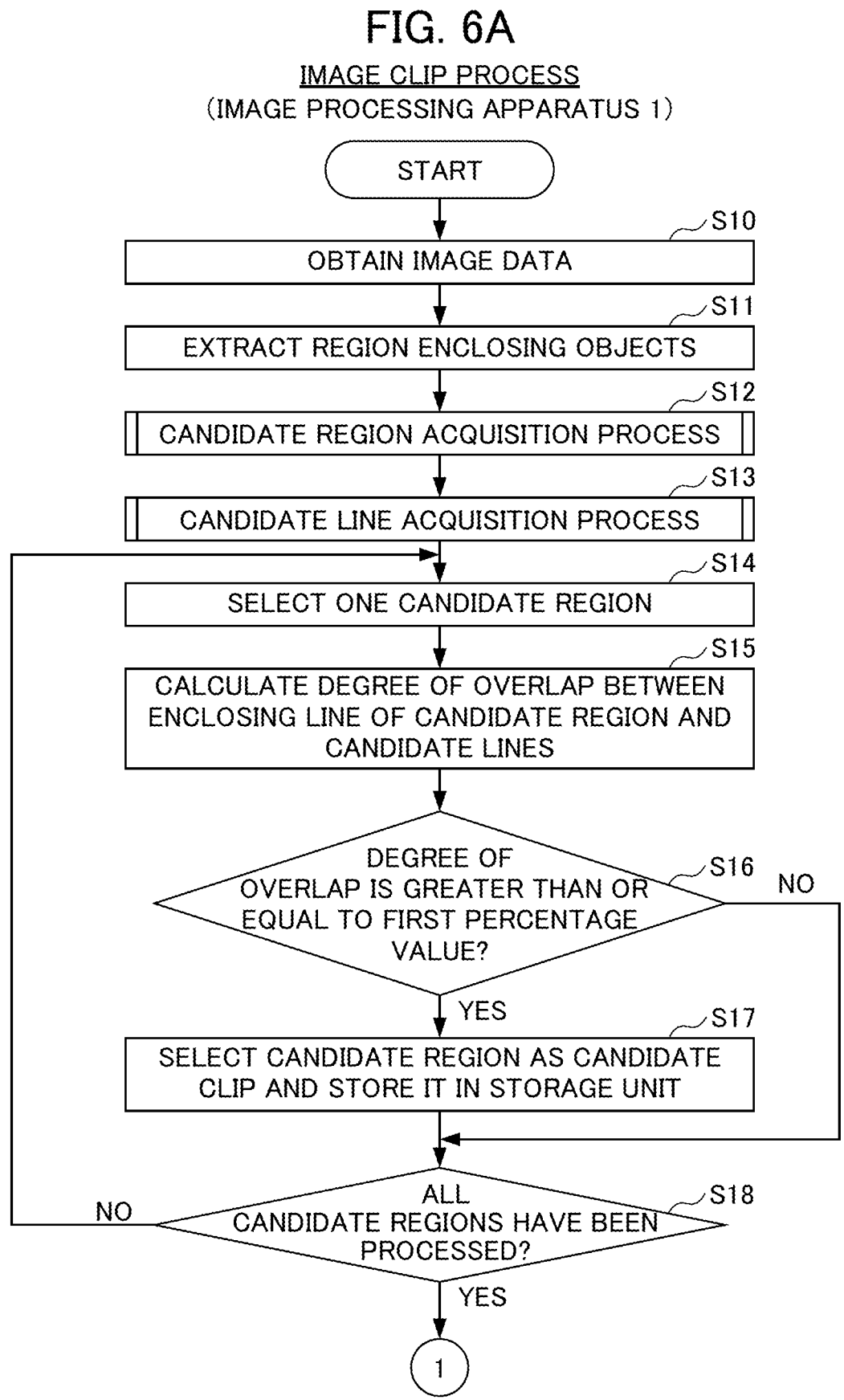

IMAGE PROCESSING APPARATUS, IMAGE PROCESSING METHOD, AND IMAGE PROCESSING PROGRAM FOR CLIPPING IMAGES INCLUDED IN A LARGE IMAGE

CROSS REFERENCE TO RELATED APPLICATIONS

This application is a National Stage of International Application No. PCT/JP2016/069489 filed Jun. 30, 2016.

TECHNICAL FIELD

The present invention relates to an image processing apparatus, an image processing method, and an image processing program.

BACKGROUND ART

Brochures prepared by travel agencies and fliers usually show various photographs for introducing, for example, good points. The photographs capture characteristics of, for example, good points. There are needs to use the photographs, including needs to store the photographs in an image database.

More specifically, for example, as shown in FIG. 3, each page of a brochure, a flier, or the like is a large piece of image data 40. In many cases, this further includes a plurality of small images 41, such as photographs.

On the other hand, the accuracy of image recognition has been significantly improved by using deep learning, including an image recognition API (hereinafter, also referred to as a "tagging engine") that recognizes the contents of an image and classifies (tags) the contents. However, for example, when a large image of each page of a brochure is directly input and tagged by the tagging engine, the image is tagged simply with the generic concept "brochure".

Thus, in order to correctly tag, using the tagging engine, each page of a brochure, a flier, or the like with what information it gives concretely, it is necessary to extract individual images (e.g., photographs) constituting a large image, such as each page of the brochure or the flier, and to tag the contents of each image (photograph) using the tagging engine.

What is required to achieve this is, for example, a technique that scans each page of the printed brochure, the flier, or the like into a large piece of image data and then extracts individual small pieces of image data (photograph parts) included in the large piece of image data.

A disclosed technique known in the art extracts a plurality of objects included in an image (e.g., Non-Patent Literature 1).

Non-Patent Literature 1: Joao Carreira, Cristian Sminchisescu, "Constrained Parametric Min-Cuts for Automatic Object Segmentation", [online], Jun. 4, 2014, [retrieved on May 20, 2016], Internet <URL:http://www.eecs.berkeley.edu/~carreira/papers/cvpr2010_2.pdf>

SUMMARY OF INVENTION

Technical Problem

However, the above technique extracts a plurality of objects included in an image, but does not extract, for example, individual small images (e.g., photographs) included in a large image. Consequently, it cannot separately recognize individual small images constituting the large image and tag each small piece of image data.

Therefore, it is an object of the present invention to provide an image processing apparatus, an image processing method, and an image processing program that are capable of clipping, from a large image, a plurality of small images (e.g., photographs) included in the large image.

Solution to Problem

An image processing apparatus according to the present invention extracts, from image data, a clip image included in the image data. The apparatus includes image data obtaining means, candidate region extraction means, candidate region group generation means, candidate line extraction means, candidate line group generation means, overlap degree determination means, and clip image region extraction means. The image data obtaining means obtains image data. The candidate region extraction means extracts, as a candidate region, a region containing an object detectable from the image data. Based on the candidate region extracted by the candidate region extraction means, the candidate region group generation means generates a candidate region group. The candidate line extraction means extracts, as a candidate line, a line that is at least either a line segment or an arc included in the image data. Based on the candidate line extracted by the candidate line extraction means, the candidate line group generation means generates a candidate line group. The overlap degree determination means determines whether the degree of overlap between a closed line forming the outline of the candidate region generated by the candidate region group generation means and the candidate line generated by the candidate line group generation means is greater than or equal to a preset predetermined first percentage value. If the overlap degree determination means determines that the degree of overlap is greater than or equal to the first percentage value, the clip image region extraction means extracts the candidate region as a clip image.

The image processing apparatus may include region area calculation means for calculating the area of the extracted region. If the area of the region calculated by the region area calculation means is greater than a preset first area value, the candidate region group generation means may exclude the region from the candidate region group.

The image processing apparatus may include line correction means for correcting the line width of the extracted line to a preset width. The candidate line group generation means may select the line corrected by the line correction means as the candidate line.

The candidate region extracted by the image processing apparatus may be a rectangular region, and the candidate line may be a line segment.

The image processing apparatus may include distortion determination means and distortion correction means. The distortion determination means determines whether the outline of the extracted region is distorted. If the distortion determination means determines that the outline of the region is distorted, the distortion correction means corrects the outline of the region to a line segment. The candidate region group generation means may select the region corrected by the distortion correction means as the candidate region.

The image processing apparatus may include aspect ratio calculation means for calculating an aspect ratio that is the ratio of the length to the width of the extracted region. If the aspect ratio of the region calculated by the aspect ratio calculation means is greater than a preset value, the candidate region group generation means may exclude the region from the candidate region group.

The image processing apparatus may include line angle determination means for determining whether the angle between the extracted line segment and a side of the candidate region is less than or equal to a preset first angle. If the line angle determination means determines that the angle is less than or equal to the first angle, the candidate line group generation means may select the line segment as the candidate line.

When the clip image region extraction means has extracted, as the clip image, at least one of a plurality of the candidate regions each having one side located on the same straight line, the clip image region extraction means may extract, as the clip image, another candidate region except the candidate region extracted as the clip image, among the plurality of candidate regions, if the degree of overlap between a closed curve forming the outline of the other candidate region and the candidate line included in the candidate line group generated by the candidate line group generation means is greater than or equal to a preset second percentage value less than the first percentage value.

The region extracted by the image processing apparatus may be a circular region, and the candidate line may be an arc.

The region extracted by the image processing apparatus may be an elliptical region, and the candidate line may be an elliptical arc.

The image processing apparatus may include tag obtaining means and clip image determination means. The tag obtaining means obtains a tag assigned by a tagging processing apparatus to the clip image extracted by the clip image region extraction means. The tagging processing apparatus analyzes an image and assigns a tag to the analyzed image. Based on the tag obtained by the tag obtaining means, the clip image determination means determines the clip image.

Alternatively, the present invention can be provided as an image processing method performed by the above image processing apparatus and an image processing program for causing a computer to function as the above image processing apparatus.

Effects of Invention

The present invention can provide an image processing apparatus, an image processing method, and an image processing program that are capable of clipping, from a large image, a plurality of small images (e.g., photographs) included in the large image.

BRIEF DESCRIPTION OF DRAWINGS

FIG. 6A is a flowchart showing an image clip process in the image processing apparatus according to this embodiment.

DESCRIPTION OF EMBODIMENTS

The following describes an embodiment of the present invention with reference to the accompanying drawings. It should be noted that this embodiment is merely an example and is not intended to limit the scope of the present invention.

EMBODIMENT

<Image Processing Apparatus 1>

Figure 1:
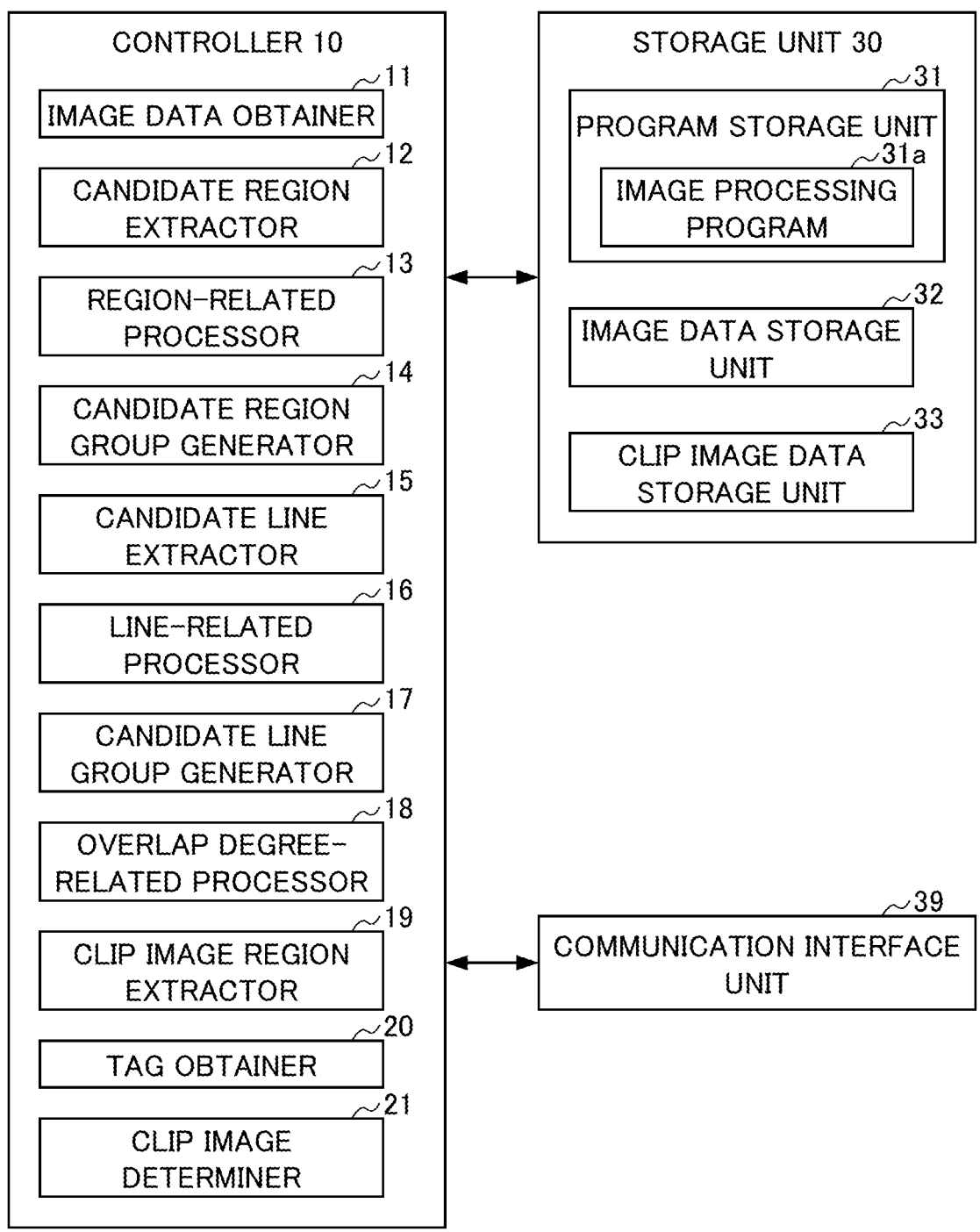
FIG. 1 is a diagram showing functional blocks of an image processing apparatus according to this embodiment.

FIG. 1 is a diagram showing functional blocks of an image processing apparatus 1 according to this embodiment.

Figure 2A:
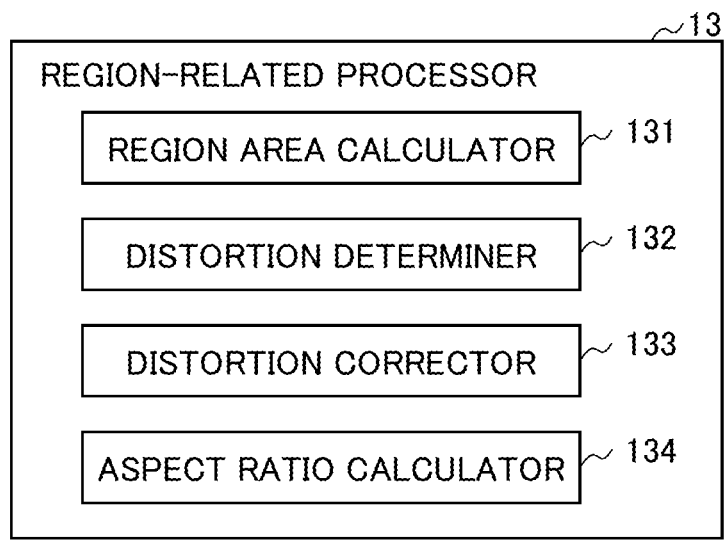
FIG. 2A is a diagram showing functional blocks of a region-related processor according to this embodiment.

FIG. 2A is a diagram showing functional blocks of a region-related processor 13 according to this embodiment.

Figure 2B:
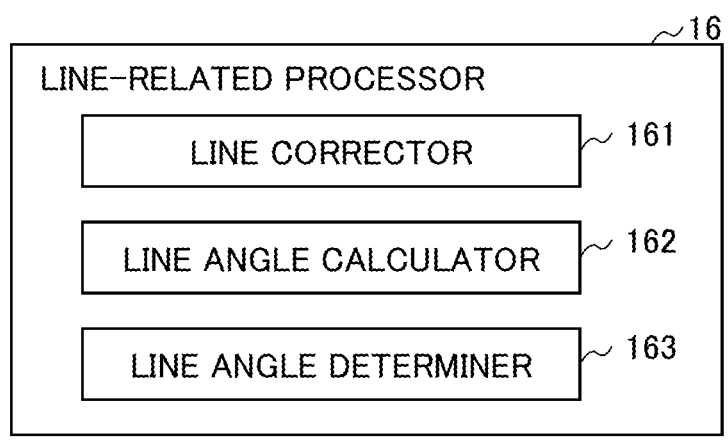
FIG. 2B is a diagram showing functional blocks of a line-related processor according to this embodiment.

FIG. 2B is a diagram showing functional blocks of a line-related processor 16 according to this embodiment.

Figure 2C:
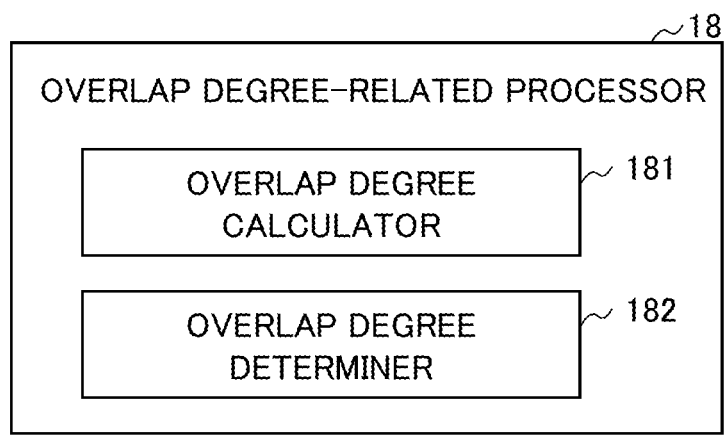
FIG. 2C is a diagram showing functional blocks of an overlap degree-related processor according to this embodiment.

FIG. 2C is a diagram showing functional blocks of an overlap degree-related processor 18 according to this embodiment.

FIGS. 3 to 5B are diagrams showing specific examples in image data according to this embodiment.

The image processing apparatus 1 is an apparatus that performs a process for clipping, from image data, a plurality of pieces of image data included in the image data, as clip images. The image processing apparatus 1 determines whether each clip image is correct, based on whether tags obtained by analyzing the clip image using a tagging engine contain reasonable information.

The image processing apparatus 1 is, for example, a server. Alternatively, the image processing apparatus 1 may be a personal computer (PC) or the like. The image processing apparatus 1 may be implemented on a single computer or may be implemented on a plurality of computers. When a plurality of computers are used, these computers are connected to each other via a communication network, such as the Internet or an intranet. The image processing apparatus 1 may be implemented, for example, as a cloud-based virtual server (virtual machine).

As shown in FIG. 1, the image processing apparatus 1 includes a controller 10, a storage unit 30, and a communication interface unit 39. The image processing apparatus 1 may further include input devices (not shown), such as a keyboard and a mouse, and output devices (not shown), such as a display and a printer.

The controller 10 is a central processing unit (CPU) that controls the overall operation of the image processing apparatus 1. The controller 10 reads and executes an operating system (OS) and application programs stored in the storage unit 30 as appropriate to perform various functions in cooperation with the above hardware.

Specifically, this embodiment illustrates how to provide the image processing apparatus 1 by causing a computer to execute the programs. The programs can be stored in a non-transitory computer-readable information storage medium, such as a compact disc, a flexible disk, a hard disk, a magneto-optical disk, a digital video disc, a magnetic tape, a read only memory (ROM), an electrically erasable programmable ROM (EEPROM), a flash memory, or a semiconductor memory. This information storage medium can be distributed and sold separately from the computer.

Typically, the computer reads programs stored in the non-transitory information storage medium into a random access memory (RAM), which is a transitory (temporary) storage device, included in the storage unit 30, and then the CPU as the controller 10 executes instructions included in the read programs.

The programs can be distributed and sold separately from a computer, which executes the programs, over a transitory transmission medium such as a computer network, for example, from a program distribution server to other computers.

The programs can be written in a programming language for describing the behavior of an electronic circuit. In this case, various types of diagrams, such as a wiring diagram and a timing diagram, are generated from the programs written in the programming language for describing the behavior of an electronic circuit. Based on these diagrams, an electronic circuit constituting the above image processing apparatus 1 can be built. For example, the above image processing apparatus 1 can be implemented on reprogrammable hardware based on field-programmable gate array (FPGA) technologies, from the programs written in the programming language for describing the behavior of an electronic circuit. In addition, an electronic circuit for a particular use can be implemented using application-specific integrated circuit (ASIC) technologies.

As described above, the image processing apparatus 1 is configured so that the controller 10 controls each unit to perform various processes to be described in this embodiment. The controller 10 will be described in detail later.

The storage unit 30 is a storage area, including hard disks and semiconductor memory devices, for storing programs, data, and the like that are required for the controller 10 to perform various processes.

The storage unit 30 includes a program storage unit 31, an image data storage unit 32, and a clip image data storage unit 33.

The program storage unit 31 is a storage area for storing various programs. The program storage unit 31 stores an image processing program 31a. The image processing program 31a is a program for providing various functions that the controller 10 of the image processing apparatus 1 performs. The image processing program 31a is preinstalled on the image processing apparatus 1.

The image data storage unit 32 is a storage area for storing image data.

The clip image data storage unit 33 is a storage area for storing clip image data.

The communication interface unit 39 is an interface unit for communicating with other devices (e.g., an image scanner (hereinafter, simply "scanner") and a tagging processing apparatus to be described later) over the communication network.

As shown in FIG. 1, the controller 10 includes an image data obtainer 11 as image data obtaining means, a candidate region extractor 12 as candidate region extraction means, the region-related processor 13, a candidate region group generator 14 as candidate region group generation means, a candidate line extractor 15 as candidate line extraction means, the line-related processor 16, a candidate line group generator 17 as candidate line group generation means, the overlap degree-related processor 18, a clip image region extractor 19 as clip image region extraction means, a tag obtainer 20 as tag obtaining means, and a clip image determiner 21 as clip image determination means.

[Image Data Obtainer 11]

The image data obtainer 11 obtains image data. The obtained image data is, for example, a large piece of image data scanned from two facing pages of a brochure, a flier, or the like.

Figure 3:
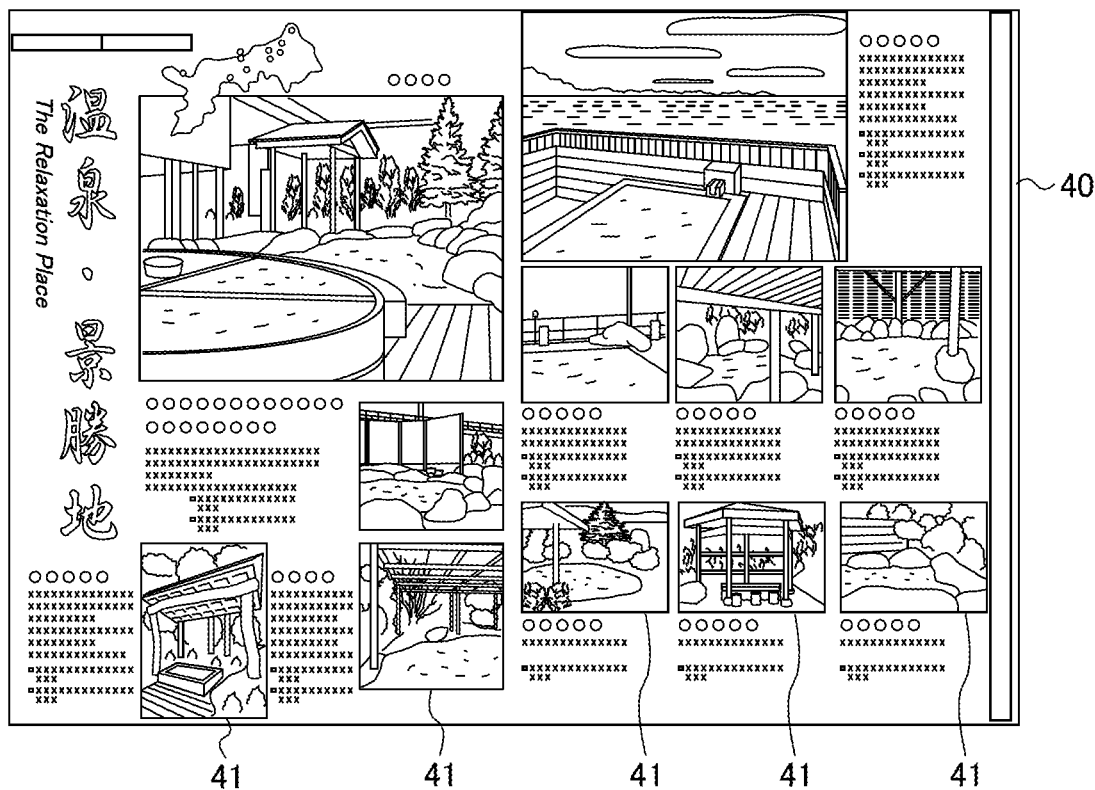
FIG. 3 is a diagram showing a specific example in image data according to this embodiment.

FIG. 3 shows an example of the image data 40 to be obtained. The image data 40 shown in FIG. 3 is a large piece of image data into which two facing pages of a hot spring brochure are scanned. The image data 40 is a large piece of image data including characters and photographs without distinction between them.

For example, the image data obtainer 11 may obtain image data by receiving the image data from the scanner via the communication interface unit 39. Alternatively, the image data obtainer 11 may obtain one piece of image data from among pieces of image data received from the scanner and stored in the image data storage unit 32

Alternatively, for example, the image data obtainer 11 may obtain, via the communication interface unit 39, image data uploaded from a terminal device (not shown).

Alternatively, the image data obtainer 11 may obtain image data specified by a user of the image processing apparatus 1, from among pieces of image data stored in the image data storage unit 32. Alternatively, the image data obtainer 11 may obtain image data for which a image clip process has not been performed, from among a plurality of pieces of image data stored in the image data storage unit 32.

[Candidate Region Extractor 12]

The candidate region extractor 12 extracts a region containing an object detectable from the obtained large piece of image data. Hereinafter, the extracted region is referred to as a "candidate region". An object means a single entity that can be detected from a large piece of image data and, for example, has similar image feature values.

A region containing an object can be extracted from a large piece of image data using various known techniques.

Examples of extracting a region containing an object from image data include what is described in "J. R. R. Uijlings, K. E. A. van de Sande, T. Gevers, and A. W. M. Smeulders, 'Selective Search for Object Recognition', Technical Report 2012, submitted to IJCV" Internet <URL:http://koen.me/research/pub/uijlings-ijcv2013-draft.pdf> (hereinafter, referred to as "Literature A").

According to the technique described in Literature A, a region containing an object is extracted by grouping similar regions together on a pixel-wise basis in a large piece of image data.

Specifically, for example, a large piece of image data is divided into first subregions using a known algorithm. In the first subregion group, the most similar neighboring subregions are grouped together to generate the second subregion group, by calculating the similarities between all neighboring subregions using predetermined similarity parameters. After that, as with the above, in the second subregion group, the most similar neighboring second subregions are grouped together to generate the third subregion group, by calculating the similarities between all neighboring second subregions using predetermined similarity parameters. In this manner, the candidate region extractor 12 can extract a candidate region by repeating such a process.

The candidate region extractor 12 can extract a plurality of candidate regions based on a wide variety of parameters by making calculations on such a large piece of image data using diversified parameters, such as different color spaces, different similarity parameters, and different first subregions obtained by a different subregion division technique.

Other examples of extracting a region containing an object from image data include binarized normed gradients (BING) for objectness estimation.

Figure 4A:
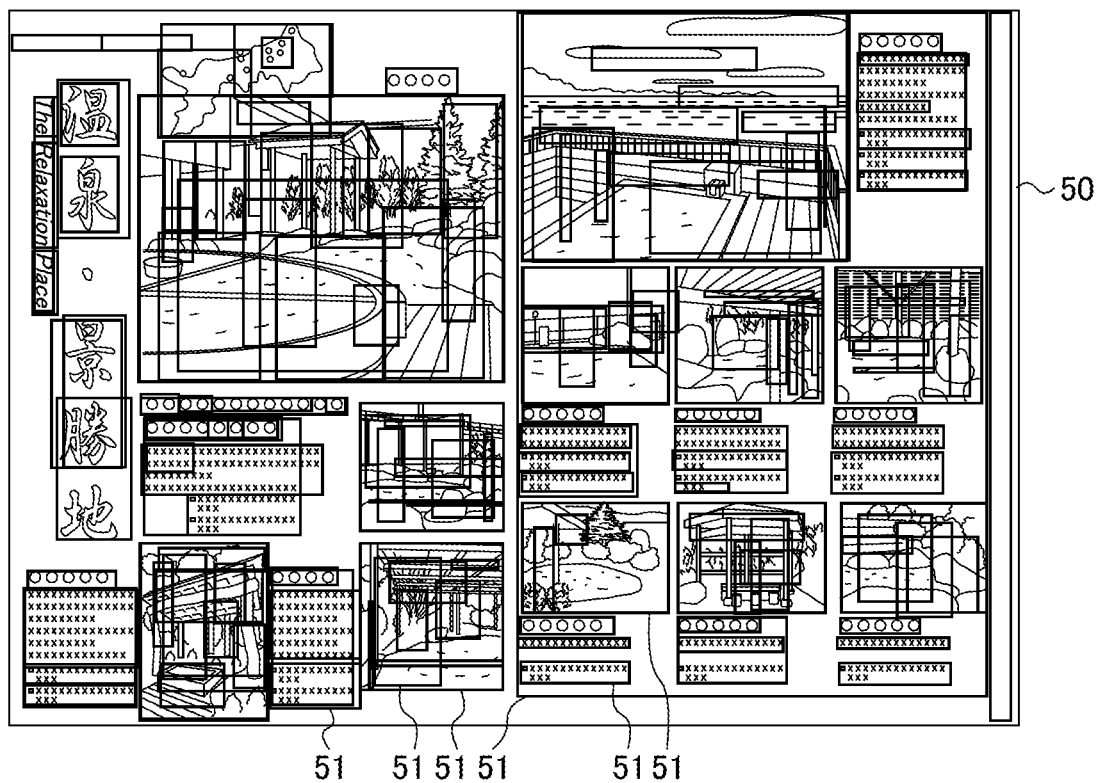
FIG. 4A is a diagram showing a specific example in the image data according to this embodiment.

FIG. 4A shows an example of image data 50 in which rectangles 51 indicate regions each enclosing an object included in the image data 40 shown in FIG. 3. Each rectangle 51 in the image data 50 shown in FIG. 4A encloses a region containing an object extracted by the candidate region extractor 12.

The shape of a candidate region generated when the candidate region extractor 12 groups similar subregions is typically, but not limited to, a rectangular region. For example, the shape of a candidate region may be a circular region or an elliptical region.

[Region-Related Processor 13]

Referring back to FIG. 1, the region-related processor 13 performs a process related to the extracted regions each enclosing the corresponding object.

As shown in FIG. 2A, the region-related processor 13 includes a region area calculator 131 as region area calculation means, a distortion determiner 132 as distortion determination means, a distortion corrector 133 as distortion correction means, and an aspect ratio calculator 134 as aspect ratio calculation means.

The region area calculator 131 calculates the area of each candidate region extracted by the candidate region extractor 12. If the area of a candidate region, which is calculated by the region area calculator 131, is greater than a preset first area value (e.g., half the area of the large piece of image data), the candidate region can be estimated not to be a region for an individual small image (e.g., photograph) included in a large image. The first area value is a predetermined value and may be determined, for example, depending on the size of the image data.

The distortion determiner 132 determines whether the outline of each candidate region extracted by the candidate region extractor 12 is distorted.

If the distortion determiner 132 determines that the outline of a candidate region is distorted, the distortion corrector 133 corrects the outline of the candidate region to have a linear shape. More specifically, if a candidate region extracted by the candidate region extractor 12 is a non-rectangular region, the distortion corrector 133 corrects the outline of the candidate region to an undistorted line segment.

The aspect ratio calculator 134 calculates an aspect ratio that is the ratio of the length to the width of each candidate region extracted by the candidate region extractor 12. If the aspect ratio of a candidate region, which is calculated by the aspect ratio calculator 134, is greater than or equal to a certain value, that is, the candidate region is a long, narrow rectangular region, the candidate region can be estimated not to be a region for an individual small image (e.g., photograph) included in a large image.

[Candidate Region Group Generator 14]

Referring back to FIG. 1, based on the candidate regions extracted by the candidate region extractor 12, the candidate region group generator 14 generates a group including the candidate regions (hereinafter, referred to as a "candidate region group").

The candidate region group generator 14 may delete a candidate region whose area, calculated by the region area calculator 131, is greater than the preset first area value, among the candidate regions extracted by the candidate region extractor 12.

The candidate region group generator 14 may delete a rectangular candidate region whose aspect ratio, calculated by the aspect ratio calculator 134, is greater than or equal to the certain value, among the candidate regions extracted by the candidate region extractor 12.

In this manner, based on the candidate regions extracted by the candidate region extractor 12, the candidate region group generator 14 can generate a candidate region group.

The candidate region group generator 14 can delete a candidate region whose area is greater than the first area value and/or whose aspect ratio is greater than or equal to the certain value in advance, among the candidate regions extracted by the candidate region extractor 12, to prevent the candidate region from being clipped out of the large piece of image data.

This can reduce the processing load on the image processing apparatus 1 clipping, from a large image, a plurality of small images (e.g., photographs) included in the large image.

The above process can generate, from a large image obtained by the image data obtainer 11, a group of candidate regions to be candidates for a plurality of small images (e.g., photographs) included in the large image.

Figure 4B:
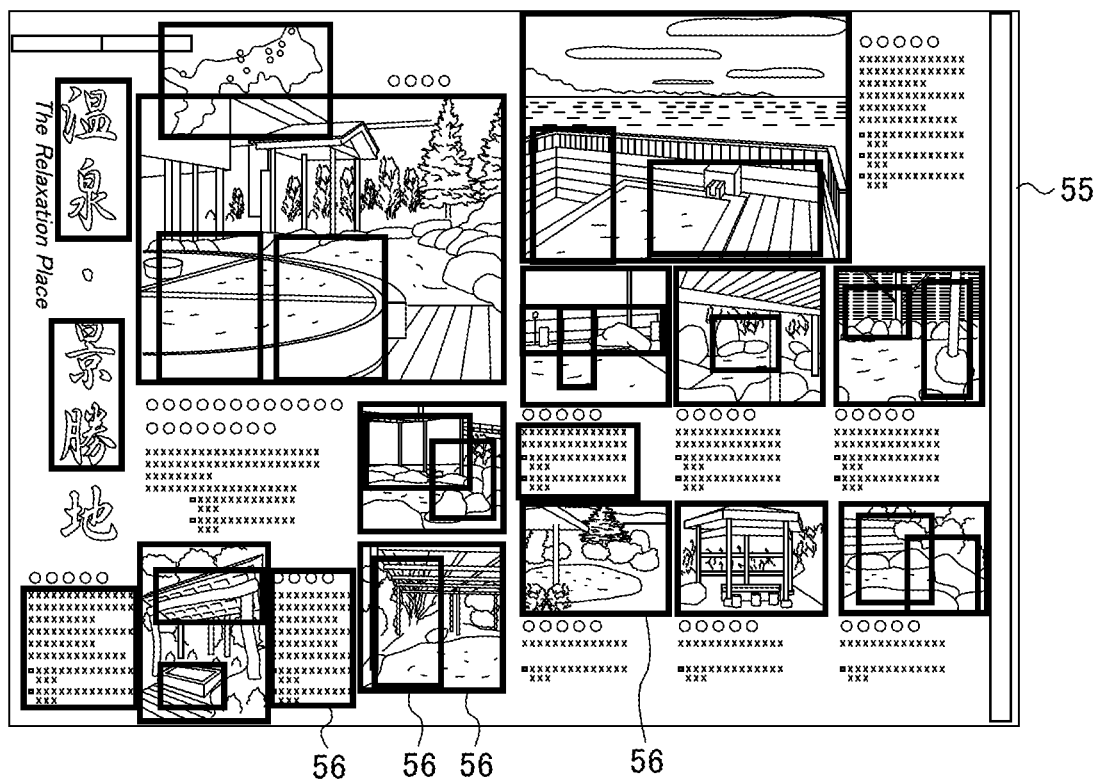
FIG. 4B is a diagram showing a specific example in the image data according to this embodiment.

FIG. 4B shows image data 55 generated by this candidate region group generator 14. The number of rectangles 56 included in the image data 55 is less than the number of the rectangles 51 included in the image data 50 shown in FIG. 4A. This is because the candidate region group generator 14 has removed rectangles 51 excluded based on their areas and aspect ratios.

The following describes the function of extracting line segments and arcs from the large image obtained by the image data obtainer 11 and then generating a group of candidate lines to be candidates for the outlines of candidate regions.

[Candidate Line Extractor 15]

The candidate line extractor 15 extracts, as candidate lines, lines that are at least either line segments or arcs included in the large piece of image data extracted by the image data obtainer 11. The candidate lines mean, for example, line segments or arcs.

Candidate lines can be extracted from the image data using various known techniques.

Examples of known techniques for extracting line segments from image data include a Line Segment Detector (LSD). The LSD is a known technique, for example, as described in "Rafael Grompone von Gioi, Jérémie Jakubowicz, Jean-Michel Morel, and Gregory Randall, 'LSD: a Line Segment Detector', Published in Image Processing On Line" Internet <http://www.ipol.im/pub/art/2012/gjmr-lsd/article.pdf> (hereinafter, referred to as "Literature B"). Specifically, the LSD calculates the frequency direction of each pixel of the image data and groups pixels having the same frequency directions into line segments.

In addition to the LSD, the Hough transform, which is known to those skilled in the art, may be used as a known technique for extracting line segments or arcs from image data.

Specifically, in order to detect line segments or arcs included in image data, the candidate line extractor 15 can generate an edge image, for example, using the known Laplacian transform, the Sobel method, or the Canny method, and then extract line segments or arcs from the generated edge image using the known Hough transform.

Figure 5A:
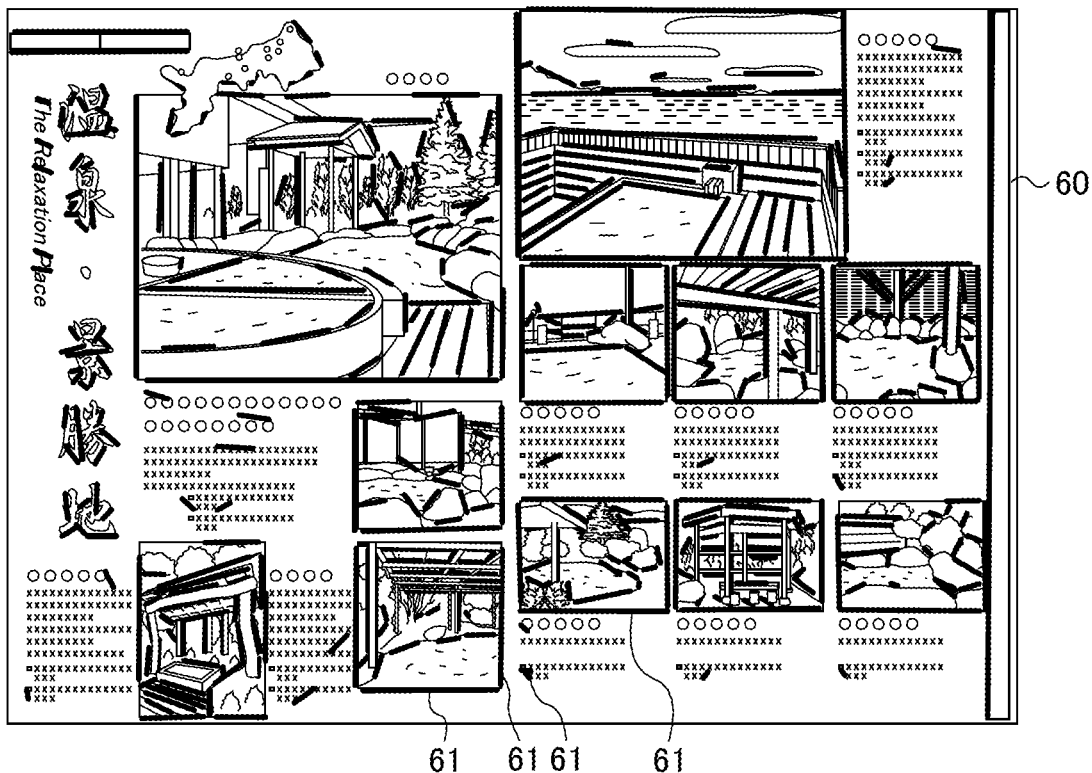
FIG. 5A is a diagram showing a specific example in the image data according to this embodiment.

FIG. 5A shows an example where the candidate line extractor 15 has extracted line segments included in a large piece of image data extracted by the image data obtainer 11. FIG. 5A shows line segments 61 extracted from the image data 40 shown in FIG. 3. As shown in FIG. 5A, image data 60 has a plurality of line segments 61. Each of the line segments 61 is a straight line.

[Line-Related Processor 16]

The line-related processor 16 performs a process related to the lines extracted from the image data by the candidate line extractor 15.

As shown in FIG. 2B, the line-related processor 16 includes a line corrector 161 as line correction means, a line angle calculator 162, and a line angle determiner 163 as line angle determination means.

The line corrector 161 corrects the line widths of at least either the line segments or the arcs extracted from the image data by the candidate line extractor 15 to a preset width. The reason why the line corrector 161 corrects the line widths of the line segments to be thicker is to make an overlap degree more clear, in a process for determining the degree to be described later.

The line angle calculator 162 calculates the angle between a line segment extracted from the image data by the candidate line extractor 15 and a side of a candidate region included in the candidate region group generated by the candidate region group generator 14.

The line angle determiner 163 determines whether the angle between a line segment extracted from the image data by the candidate line extractor 15 and a side of a candidate region included in the candidate region group generated by the candidate region group generator 14 is less than or equal to a preset first angle.

The first angle is, for example, an acute angle of 10 degrees. When the line segment is parallel to the side of the candidate region, the calculated angle is zero degrees.

If the angle of the line segment extracted from the image data by the candidate line extractor 15 and the side of the candidate region included in the candidate region group generated by the candidate region group generator 14 is greater than the preset first angle, the line segment and the side of the candidate region can be estimated not to overlap by the line angle determiner 163.

[Candidate Line Group Generator 17]

Referring back to FIG. 1, based on the candidate lines extracted by the candidate line extractor 15, the candidate region group generator 14 generates a group of candidate lines.

The candidate line group generator 17 may replace candidate lines before the correction with the corresponding candidate lines corrected by the line corrector 161 to include the corrected candidate lines in a candidate line group.

The candidate line group generator 17 may also delete a candidate line that is a line segment forming an angle of greater than the preset first angle with a side of a candidate region included in the candidate region group generated by the candidate region group generator 14, from a group of line segments extracted from the image data by the candidate line extractor 15.

This can reduce the processing load on the image processing apparatus 1 clipping, from a large image, a plurality of small images (e.g., photographs) included in the large image.

The above process can generate, from a large image obtained by the image data obtainer 11, a group of candidate regions to be candidates for a plurality of small images (e.g., photographs) included in the large image.

Figure 5B:
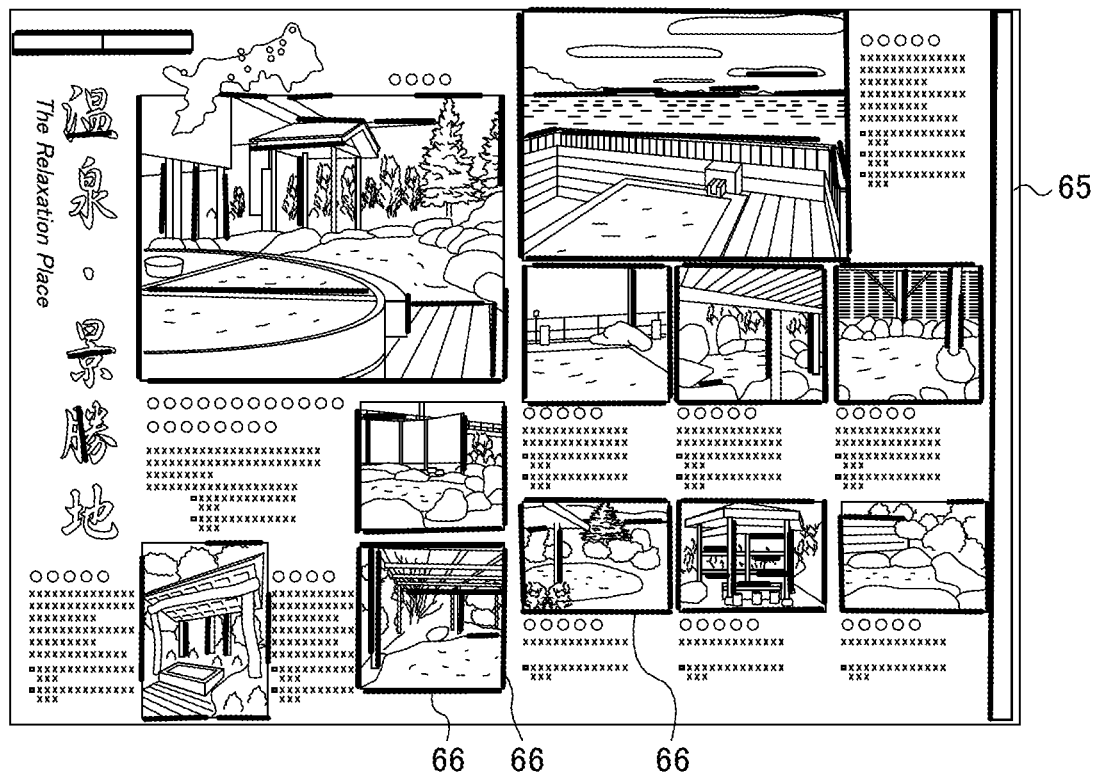
FIG. 5B is a diagram showing a specific example in the image data according to this embodiment.

FIG. 5B shows image data 65 including only line segments 66 left after the line angle determiner 163 deletes candidate lines each of which is a line segment forming an angle of greater than the preset first angle with a side of a candidate region included in the candidate region group generated by the candidate region group generator 14.

The number of the line segments 66 included in the image data 65 is less than the number of the line segments 61 included in the image data 60 shown in FIG. 5A. This is because the candidate line group generator 17 has removed line segments 61 with an angle of greater than the first angle. That is, in the image data 65 shown in FIG. 5B, oblique line segments 61 included in the image data 60 have been deleted.

Through the above process, the image processing apparatus 1 can extract line segments and arcs from a large image obtained by the image data obtainer 11 and then generate a group of candidate lines to be candidates for the outlines of candidate regions.

The following describes the function of clipping, from a large image, a plurality of small images (e.g., photographs) included in the large image by detecting the degree of overlap between the group of candidate regions that is generated by the candidate region group generator 14 and the group of candidate lines that is generated by the candidate line group generator 17.

[Overlap Degree-Related Processor 18]

The overlap degree-related processor 18 performs a process related to the degree of overlap between a closed line (also referred to as an "enclosing line") forming the outline of a candidate region generated by the candidate region group generator 14 and the candidate lines generated by the candidate line group generator 17.

As shown in FIG. 2C, the overlap degree-related processor 18 includes an overlap degree calculator 181 as overlap degree calculation means and an overlap degree determiner 182 as overlap degree determination means.

The overlap degree calculator 181 calculates the degree of overlap between the enclosing line of a candidate region generated by the candidate region group generator 14 and the candidate lines generated by the candidate line group generator 17. Specifically, the overlap degree calculator 181 calculates an overlap degree that indicates what percentage of the enclosing line of each candidate region overlaps with the candidate lines generated by the candidate line group generator 17. For example, when the overlap degree of a candidate region is 70%, it means that 70% of the enclosing line of the candidate region overlaps with the candidate lines generated by the candidate line group generator 17.

The overlap degree determiner 182 determines, for each candidate region generated by the candidate region group generator 14, whether the degree of overlap between the candidate region and the candidate lines, which is calculated by the overlap degree calculator 181, is greater than or equal to a preset predetermined first percentage value. For example, assuming that the first percentage value is 50%, the overlap degree determiner 182 determines whether 50% or more of the enclosing line of the candidate region overlaps with the candidate lines generated by the candidate line group generator 17. The first percentage value is not limited to this value and can be set as appropriate, for example, depending on the characteristics of the image.

[Clip Image Region Extractor 19]

Referring back to FIG. 1, the clip image region extractor 19 extracts candidate regions as candidate clip images, based on the determination by the overlap degree determiner 182.

Specifically, the clip image region extractor 19 extracts, as candidate clip images, candidate regions whose overlap degrees are determined to be greater than or equal to the first percentage value by the overlap degree determiner 182, and then generates a group of candidate clip images.

The clip image region extractor 19 can be configured to extract, as a candidate clip image, a candidate region having one side located on the same straight line as one side of another candidate region included in the group of candidate clip images and to add the candidate region to the group of candidate clip images, if the overlap degree of the candidate region is less than the first percentage value but greater than or equal to a preset second percentage value.

That is, the clip image region extractor 19 can extract candidate regions each having one side located on the same straight line as one side of another candidate region included in the group of candidate clip images and then add, as a candidate clip image, an extracted candidate region whose overlap degree is determined to be greater than or equal to the second percentage value to the group of candidate clip images.

Alternatively, the clip image region extractor 19 may be configured to extract candidate regions whose overlap degrees, calculated by the overlap degree calculator 181, are greater than or equal to the second percentage value and less than the first percentage value and to add, as a candidate clip image, an extracted candidate region having one side located on the same straight line as one side of another candidate region included in the group of candidate clip images to the group of candidate clip images.

The second percentage value is a value less than the first percentage value. For example, assuming that the second percentage value is 30%, a candidate region having one side located on the same straight line as one side of another candidate region included in the group of candidate clip images is added as a candidate clip image to the group of candidate clip images if the overlap degree of the candidate region is greater than or equal to 30%. The second percentage value is not limited to this value and can be set as appropriate, for example, depending on the characteristics of the image.

[Modifications of Clip Image Region Extractor 19]

The clip image region extractor 19 extracts the candidate regions extracted by the candidate region extractor 12 as candidate clip images without modification. However, the extraction of candidate clip images is not limited to this.

The clip image region extractor 19 may be configured to extract a candidate clip image, based on candidate lines corresponding to an overlap degree that is determined to be greater than or equal to a predetermined percentage value by the overlap degree determiner 182. Specifically, the clip image region extractor 19 may extract, as a candidate clip image, a region formed by crossing candidate lines that overlap with the enclosing line of a candidate region or by extending and then crossing the candidate lines.

[Tag Obtainer 20]

The tag obtainer 20 requests a tagging processing apparatus (not shown) as a tagging engine to tag each candidate clip image included in the group of candidate clip images extracted and generated by the clip image region extractor 19, for example, via the communication interface unit 39, and then obtains tags (e.g., classifications or categories) for the candidate clip image.

The tagging engine assigns tags to image data using image analysis. The tagging engine can use various known techniques.

Examples of tagging engines that obtain tags using image analysis include a technique described in "Kaiming He Xiangyu Zhang Shaoqing Ren Jian Sun, 'Deep Residual Learning for Image Recognition', Microsoft Research" (hereinafter, referred to as "Literature C"). According to the technique described in Literature C, what is shown in target image data is analyzed to assign tags estimated by comparing it with a learning tool that has built a model from images.

The tag obtainer 20 can obtain tags for each candidate clip image via an image recognition API provided by the tagging engine.

[Clip Image Determiner 21]

The clip image determiner 21 determines whether to select a candidate clip image as a clip image, based on the tags obtained for the candidate clip image by the tag obtainer 20.

More specifically, if the tags obtained for each candidate clip image are a plurality of unrelated tags, the clip image determiner 21 determines that the candidate clip image is not one small image (e.g., photograph).

The clip image determiner 21 may determine whether the obtained tags are related to each other, for example, based on whether the tags belong to related or similar categories, for example, by checking the obtained tags against a prepared tag database (not shown) that stores tag relational information. The tag database may be included in the image processing apparatus 1 or may be included in an external server accessible via the communication interface unit 39.

With a specific example, an example where actually two photographs related to food and a Japanese-style hotel are recognized as one image through the above process and extracted as a candidate clip image is examined. This occurs because no space is left between the photograph related to the food and the other photograph related to the Japanese-style hotel. Thus, the photographs are extracted as one candidate clip image through the above process. The tag obtainer 20 obtains tags unrelated to each other, such as "food" and "Japanese-style hotel". Through the above process, these tags are determined to be tags unrelated to each other. Consequently, the clip image determiner 21 determines that the candidate clip image is not one small image and thus does not select the candidate clip image as a clip image.

If the clip image determiner 21 determines that the candidate clip image is not one small image, the controller 10 allows the candidate clip image to be recognized as two images by readjusting the overlap degree of the candidate clip image.

Alternatively, if the clip image determiner 21 determines that the candidate clip image is not one small image, the controller 10 may output only recognition candidates (e.g., whether recognizes as one or two images) as the result and then determine, also in view of the result of the tagging, which of the recognition candidates to select, instead of readjusting the overlap degree of the candidate clip image.

Further alternatively, if the clip image determiner 21 determines that the candidate clip image is not one small image, the controller 10 may allow users to make the determination by outputting an error to an output device, such as a display or a printer.

As described above, the image processing apparatus 1 can select one candidate clip image as a plurality of clip images, based on the determination by the clip image determiner 21.

The image processing apparatus 1 can also select a plurality of candidate clip images as one clip image, based on the determination by the clip image determiner 21. This is a case where actually one photograph is recognized as two or more images through the above process and extracted as candidate clip images. In such a case, two or more candidate clip images adjoin, and tags obtained for one of the candidate clip images are the same as or closely related to those obtained for another. In that case, the image processing apparatus 1 can select the candidate clip images as one clip image.

In addition, the image processing apparatus 1 can modify a candidate clip image that is determined to be an incorrect region by the clip image determiner 21 to a correct region and then select the candidate clip image as a clip image.

As described above, the image processing apparatus 1 according to this embodiment enables a plurality of small images (e.g., photographs) included in a large image to be clipped from the large image.

<How Image Processing Apparatus 1 Works>

The following describes how the image processing apparatus 1 according to this embodiment processes images, with reference to the accompanying drawings. The image processing apparatus 1 generates a group of candidate regions, based on the result of processing by the region-related processor 13, and also generates a group of candidate lines, based on the result of processing by the line-related processor 16.

Figure 6B:
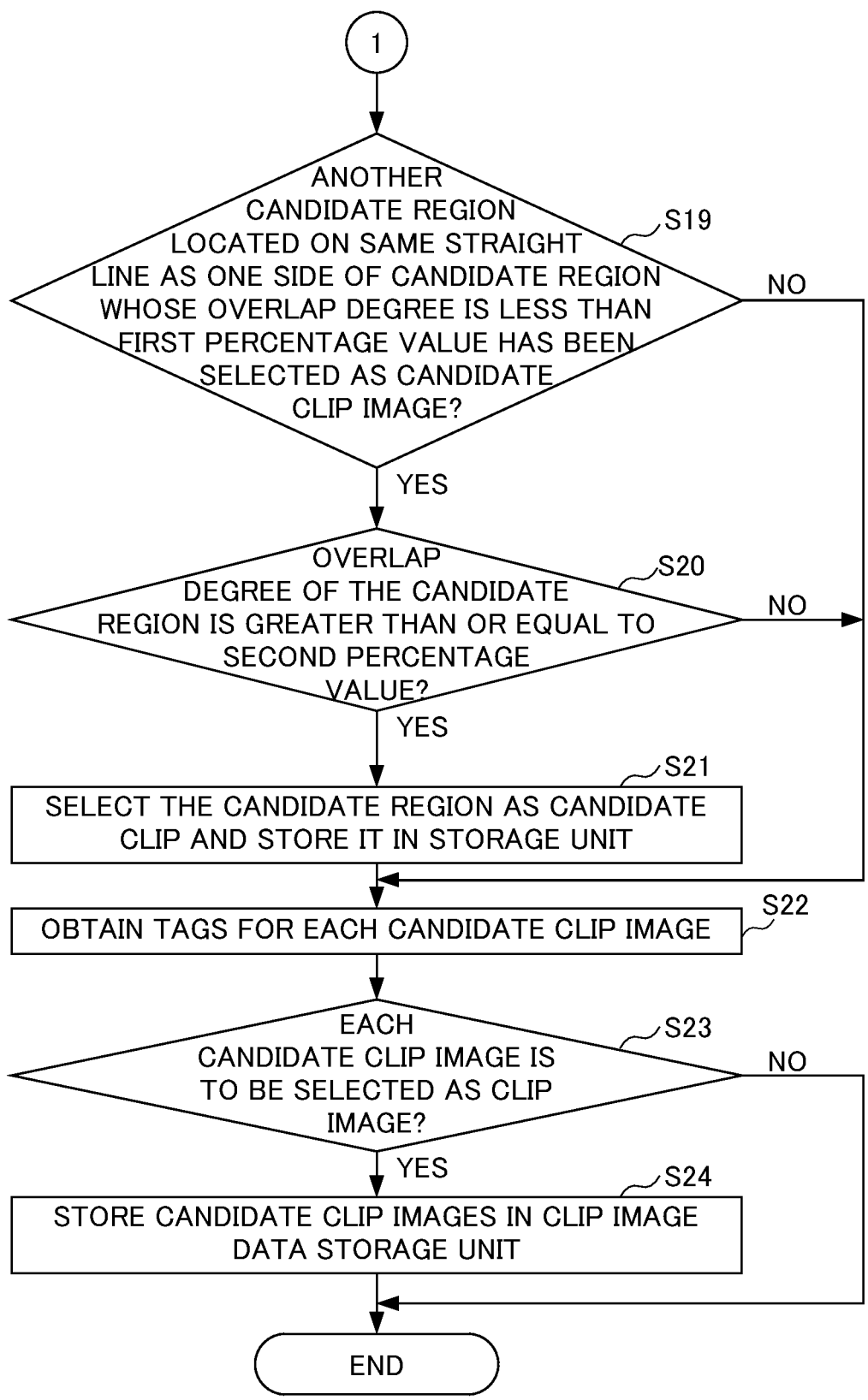
FIG. 6B is a flowchart showing the image clip process in the image processing apparatus according to this embodiment.
Figure 7:
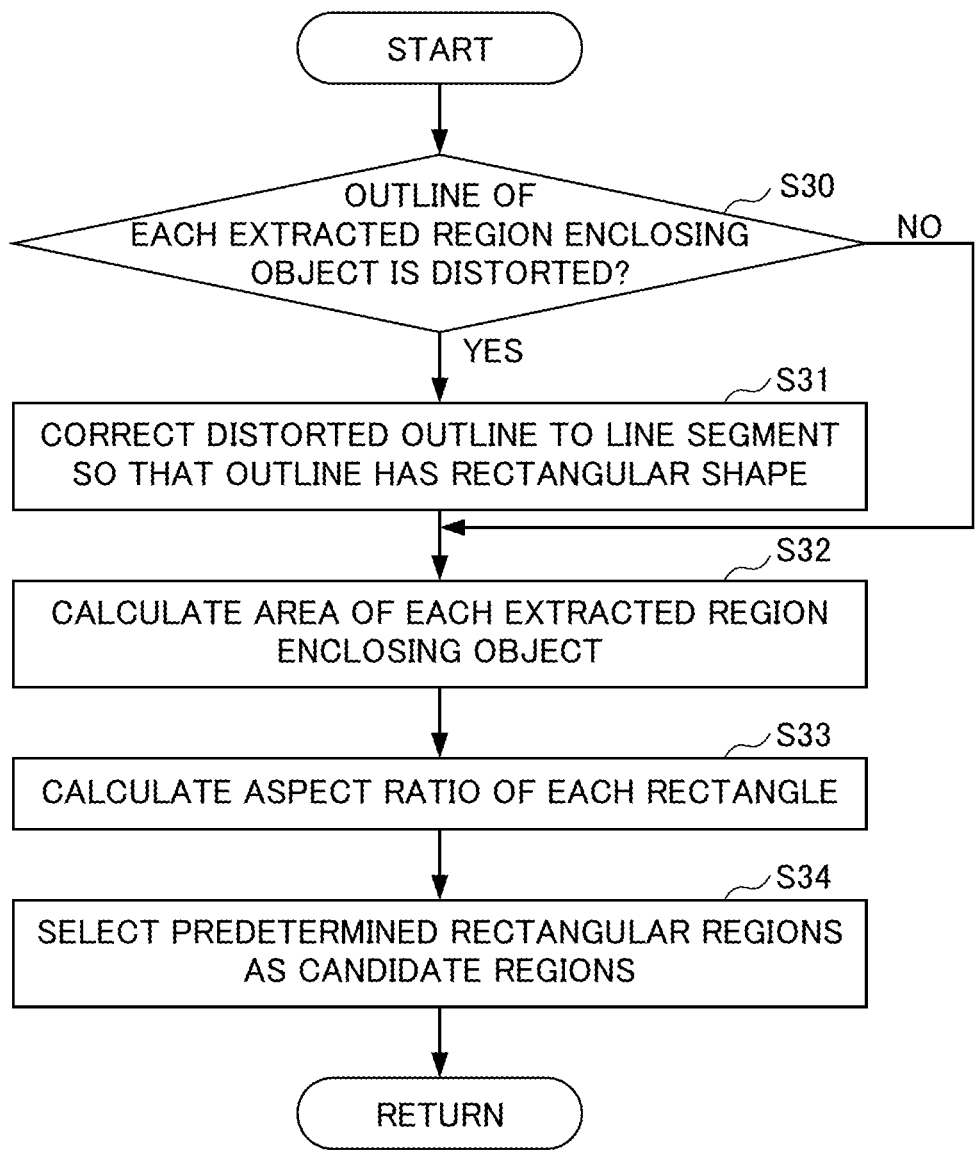
FIG. 7 is a flowchart showing a candidate region acquisition process in the image processing apparatus according to this embodiment.
Figure 8:
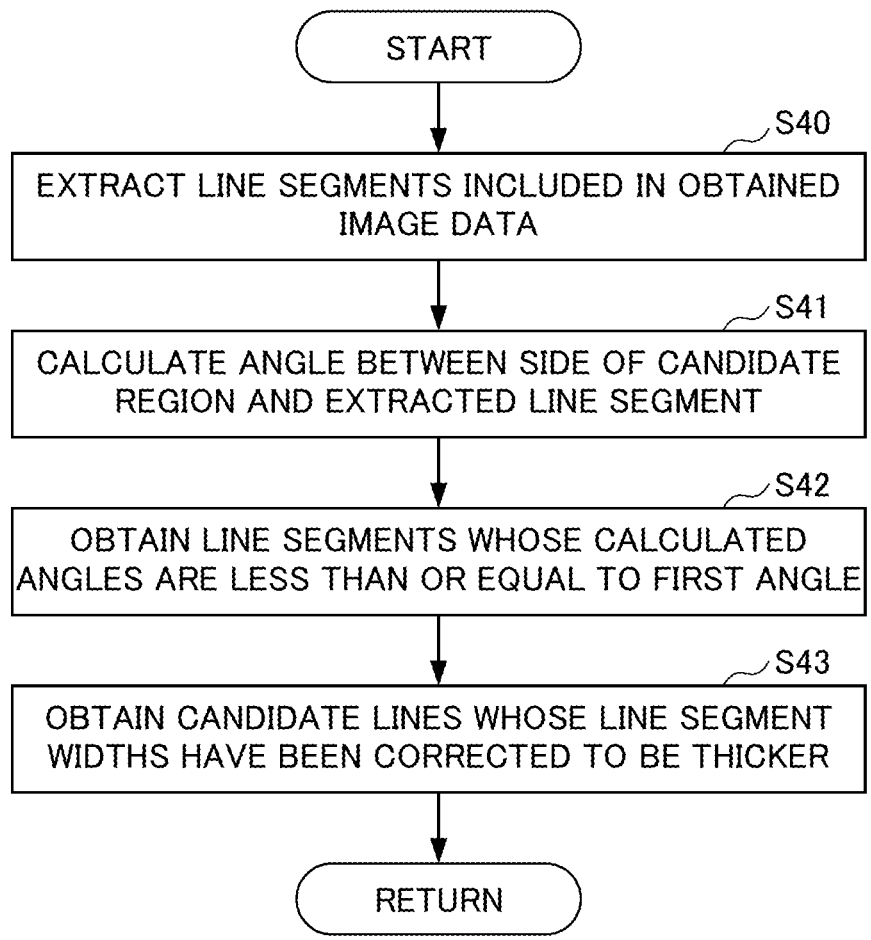
FIG. 8 is a flowchart showing a candidate line acquisition process in the image processing apparatus according to this embodiment.

FIGS. 6A and 6B are each a flowchart showing the entire procedure for processing images. FIGS. 7 and 8 are each a flowchart showing the procedure for a specific process in the image processing. It should be noted that the process flow described here is an example process flow (flowchart) for implementing the function of each functional unit described above. The flow for implementing the function of each functional unit described above is not limited to this flowchart.

If the image processing apparatus 1 is implemented, for example, using a computer, the image processing is started, for example, when a user gives a start command to start the image processing via the input device now shown, the controller 10 receives a signal indicating this start command, and then the image processing program 31a stored in the program storage unit 31 is initiated.

In Step S (hereinafter, simply "S") 10 of FIG. 6A, the controller 10 (the image data obtainer 11) of the image processing apparatus 1 obtains one of the pieces of image data stored in the image data storage unit 32. In this step, the controller 10 may obtain image data specified by a user of the image processing apparatus 1, from among the pieces of image data stored in the image data storage unit 32. Alternatively, the controller 10 may obtain image data for which the image clip process has not been performed, from among the plurality of pieces of image data stored in the image data storage unit 32. In addition, the controller 10 may obtain image data received from the scanner not shown via the communication interface unit 39.

In S11, the controller 10 (the candidate region extractor 12) extracts a region containing an object from the obtained image data.

In this step, a region containing an object can be extracted from the image data using various known techniques, as described above.

The controller 10 (the candidate region extractor 12) can obtain a plurality of regions each enclosing an object included in the image data, for example, by applying the "Selective Search" to the image data. For example, the controller 10 may cause the storage unit 30 to have a candidate region management table and to store each obtained region enclosing the corresponding object and its position information in the table.

In S12, the controller 10 (the region-related processor 13) performs a process related to candidate regions.

The process related to candidate regions is described here with reference to FIG. 7.

In S30 of FIG. 7, the controller 10 (the distortion determiner 132) determines whether the outline of each extracted region enclosing the corresponding object is distorted. The outline is distorted, for example, when the corresponding object has been extracted using a technique different from the "Selective Search" or when the corresponding object has been extracted by enclosing it in a non-rectangular shape. If the outline is distorted (YES in S30), the controller 10 causes the process to proceed to S31. On the other hand, if the outline is not distorted (NO in S30), the controller 10 causes the process to proceed to S32.

In S31, the controller 10 (the distortion corrector 133) corrects the distorted outline to a line segment so that the outline has a rectangular shape. In this step, the controller 10 may cross line segments or may extend and then cross line segments to form rectangles. This step enables each region enclosing the corresponding object to be rectangular.

In S32, the controller 10 (the region area calculator 131) calculates the area of each extracted region enclosing the corresponding object. In this step, the controller 10 may cause the candidate region management table to store the calculated area in association with the corresponding region enclosing the object.

In S33, the controller 10 (the aspect ratio calculator 134) calculates the aspect ratio of each rectangle. In this step, the controller 10 may cause the candidate region management table to store the calculated ratio in association with the corresponding region enclosing the object.

In S34, the controller 10 (the candidate region group generator 14) selects predetermined rectangular regions as candidate regions that are candidates for clip images. In this step, the controller 10 selects each predetermined rectangular region as a candidate region, based on its area and aspect ratio.

Specifically, the controller 10 does not select, as a candidate region, a region whose area calculated in S32 is greater than the first area value and which encloses the corresponding object. The first area value is a predetermined value as described above. For example, the first area value may be determined depending on the size of the image data or may be given as a parameter. This enables the image processing apparatus 1 to prevent a large rectangular region included in the image data from being clipped.

The controller 10 does not select, as a candidate region, a region whose aspect ratio calculated in S33 is greater than or equal to the certain value and which encloses the corresponding object. This enables the image processing apparatus 1 to prevent a long, narrow rectangular region included in the image data from being clipped.

The controller 10 may delete a record for a region whose area is greater than the first area value and which encloses the corresponding object and a record for a region whose ratio is greater than or equal to the certain value and which encloses the corresponding object, from the candidate region management table.

After that, the controller 10 terminates this candidate region acquisition process and then causes the process to return to S13 of FIG. 6A.

Referring back to FIG. 6A, in S13, the controller 10 performs a candidate line acquisition process.

The candidate line acquisition process is described here with reference to FIG. 8.

In S40 of FIG. 8, the controller 10 (the candidate line extractor 15) extracts line segments included in the image data.

In this step, line segments can be extracted from the image data using various known techniques, as described above.

The controller 10 (the candidate line extractor 15) can obtain a plurality of line segments included in the image data, for example, by applying the "Line Segment Detector (LSD)" to the image data. For example, the controller 10 may cause the storage unit 30 to have a candidate line management table and to store each obtained line segment and its position information in the table.

In S41, the controller 10 (the line angle calculator 162) calculates, for every extracted line segment, the angle between the line segment and each side of one of the candidate regions. Each candidate region obtained in the candidate region acquisition process is rectangular (S12 of FIG. 6A). Thus, the controller 10 only needs to calculate the angle between each side of one of the candidate regions and each extracted line segment. In this step, the controller 10 may cause the candidate line management table to store the calculated angle in association with the corresponding line segment.

In S42, the controller 10 (the candidate line group generator 17) obtains line segments whose calculated angles are determined to be less than or equal to the first angle by the line angle determiner 163. Specifically, the controller 10 (the candidate line group generator 17) deletes, from a group of candidate lines, a candidate line that is a line segment forming an angle of greater than the first angle with a side of a candidate region included in a candidate region group generated by the candidate region group generator 14. The first angle is a predetermined value as described above. For example, the first angle may be given as a parameter. In this step, the controller 10 may delete a record for a line segment whose angle is greater than the first angle, from the candidate line management table. When the line segment is parallel to the side of the candidate region, the calculated angle is zero degrees.

In S43, the controller 10 (the line corrector 161) corrects the line segment widths of candidate lines included in a candidate line group to a predetermined width. The controller 10 (the candidate line group generator 17) then replaces the candidate lines before the correction with the corresponding corrected candidate lines to include the corrected candidate lines in the candidate line group. After that, the controller 10 terminates this candidate region acquisition process and then causes the process to return to S14 of FIG. 6A.

Referring back to FIG. 6A, in S14, the controller 10 selects one of the candidate regions.

In S15, the controller 10 (the overlap degree calculator 181) calculates the degree of overlap between a rectangle that is the enclosing line of the selected candidate region and the candidate lines. In this step, the controller 10 may cause the candidate region management table to store the degree of overlap with a candidate line that is each line segment in the candidate line management table, in association with the corresponding region containing an object, that is, the selected candidate region.

In S16, the controller 10 (the overlap degree determiner 182) determines whether the calculated degree of overlap is greater than or equal to the first percentage value. The first percentage value is a predetermined value. For example, the first percentage value is a value of 50%. If the calculated degree of overlap is greater than or equal to the first percentage value (YES in S16), the controller 10 causes the process to proceed to S17. On the other hand, if the calculated degree of overlap is less than the first percentage value (NO in S16), the controller 10 causes the process to proceed to S18.

In S17, the controller 10 (the clip image region extractor 19) selects the candidate region as a candidate clip image. The controller 10 then causes the storage unit 30 to temporarily store the candidate clip image. In this step, the controller 10 may assign the corresponding candidate region in the candidate region management table a flag indicating that the candidate region is a candidate clip image.

In S18, the controller 10 determines whether all the candidate regions have been processed. If all the candidate regions have been processed (YES in S18), the controller 10 causes the process to proceed to S19 of FIG. 6B. On the other hand, if not all the candidate regions have been processed (NO in S18), the controller 10 causes the process to proceed to S14 and iteratively processes for other unprocessed candidate regions.

In S19 of FIG. 6B, the controller 10 determines whether another candidate region located on the same straight line as one side of a candidate region whose degree of overlap calculated in S15 of FIG. 6A is less than the first percentage value has been selected as a candidate clip image. The controller 10 can make this determination using the candidate region management table and the candidate line management table. If the other candidate image has been selected as a candidate clip image (YES in S19), the controller 10 causes the process to proceed to S20. On the other hand, if the other candidate image has not been selected as a candidate clip image (NO in S19), the controller 10 causes the process to proceed to S22.

In S20, the controller 10 (the clip image region extractor 19) determines whether the overlap degree of the candidate region having one side located on the same straight line as one side of the other candidate region, which has been selected as a candidate clip image, is greater than or equal to the second percentage value, which is less than the first percentage value. The second percentage value is a predetermined value. For example, the second percentage value is a value of 30%. If the overlap degree is greater than or equal to the second percentage value (YES in S20), the controller 10 causes the process to proceed to S21. On the other hand, if the degree overlap is less than the second percentage value (NO in S20), the controller 10 causes the process to proceed to S22.

In S21, the controller 10 selects the candidate region, whose overlap degree is greater than or equal to the second percentage value, as a candidate clip image. The controller 10 then causes the storage unit 30 to temporarily store the candidate clip image. In this step, the controller 10 may assign the corresponding candidate region in the candidate region management table a flag indicating that the candidate region is a candidate clip image. The controller 10 may assign the candidate region a flag different from the above flag assigned in S17, in order to indicate that the overlap degree of the candidate region is greater than or equal to the second percentage value.

In this manner, the controller 10 can efficiently perform the process using the candidate region management table and the candidate line management table.

Figure 9:
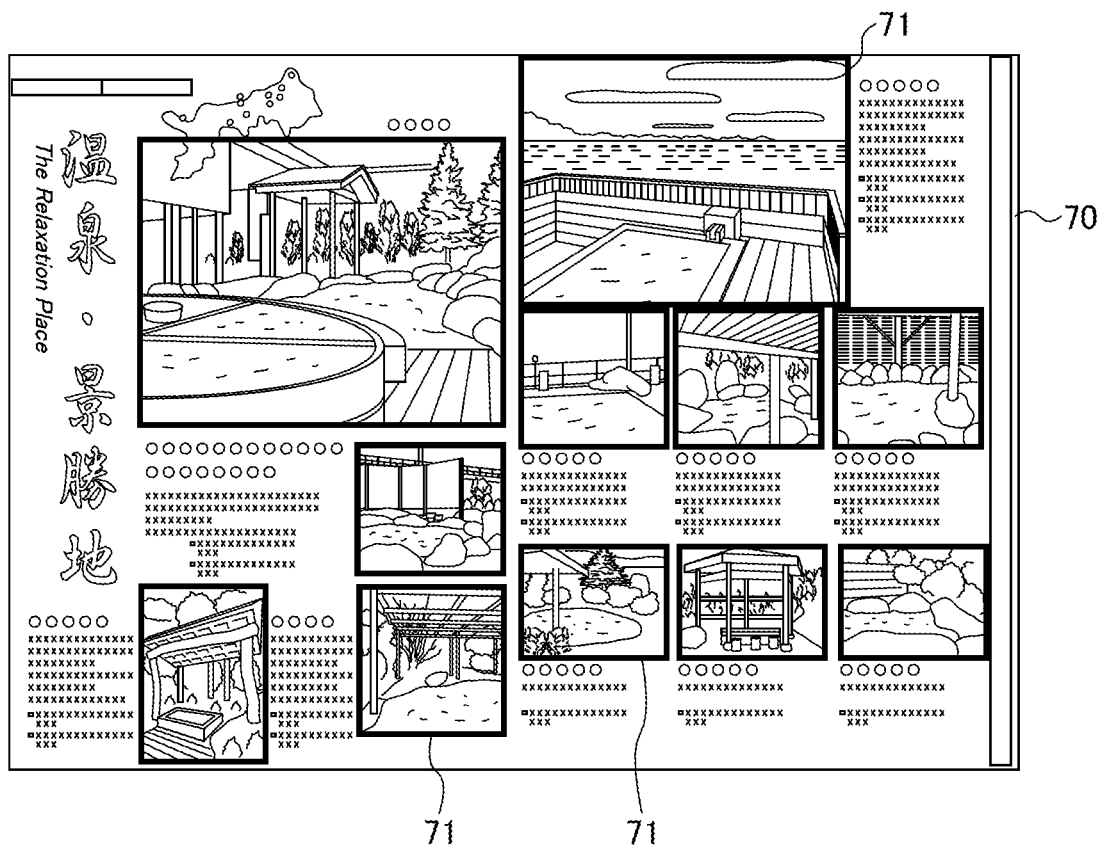
FIG. 9 is a diagram showing an example of clip image data according to this embodiment.

FIG. 9 shows image data 70 showing candidate clip images 71. As shown in the above process, the controller 10 obtains a candidate region and candidate lines, and then selects the candidate region as a candidate clip image 71, based on the degree of overlap between the candidate region and the candidate lines.

Referring back to FIG. 6B, in S22, the controller 10 sends each candidate clip image temporarily stored in the storage unit 30 to a tagging processing apparatus (not shown) as a tagging engine over the communication network. The controller 10 (the tag obtainer 20) then receives tags corresponding to each candidate clip image from the tagging processing apparatus.

As described above, various known techniques can be used for the tagging engine that analyzes each candidate clip image and assigns it tags.

The controller 10 (the tag obtainer 20) can obtain tags for each candidate clip image, for example, via an image recognition API provided by the tagging engine.

When a candidate clip image is a photographic image showing a hot spring, for example, the tag "hot spring" is assigned to the candidate clip image in this step.

In S23, the controller 10 (the clip image determiner 21) determines whether to select each candidate clip image as a clip image, based on the tags obtained for the candidate clip image. For example, if a plurality of unrelated tags are obtained for the candidate clip image, different images must have been joined. Thus, based on the tags, the controller 10 (the clip image determiner 21) determines that the candidate clip image is not selected as a clip image. If the candidate clip image is selected as a clip image (YES in S23), the controller 10 causes the process to proceed to S24. On the other hand, if the candidate clip image is not selected as a clip image (NO in S23), the controller 10 terminates this process.

In S24, the controller 10 (the clip image determiner 21) causes the clip image data storage unit 33 to store candidate clip images determined to be selected as clip images. After that, the controller 10 terminates this process.

As described above, the image processing apparatus 1 according to this embodiment produces the following effects.

(1) The image processing apparatus 1 applies a known object extraction technique to image data and extracts candidate regions each enclosing an object. On the other hand, the image processing apparatus 1 applies, to the same image data, a known line segment detection technique for detecting line segments included in image data and extracts candidate lines. Based on the degree of overlap between the outline of each candidate region and the candidate lines, the image processing apparatus 1 can efficiently extracts candidate regions as clip images from the image data.

(2) The image processing apparatus 1 excludes in advance a candidate region whose area and aspect ratio satisfy predetermined criteria. This enables a reduction in the processing load on the image processing apparatus 1 calculating the degree of overlap between the outline of each candidate region and the candidate lines, thus increasing the speed of the extraction.

(3) Too thin line segments can cause the degree of overlap between the outline of each candidate region and the line segments to be calculated inaccurately. For this reason, the image processing apparatus 1 precorrects the line widths of line segments, which are to be the candidate lines, to be thicker, thus calculating the degree of overlap between the outline of each candidate region and the line segments more accurately.

(4) The candidate regions are rectangular regions, and the candidate lines are line segments. Thus, the image processing apparatus 1 can extract clip images each having a rectangular region.

(5) If the outline of a candidate region is distorted, the image processing apparatus 1 precorrects the distortion, thus calculating the degree of overlap between the candidate region and the candidate lines more accurately.

(6) The image processing apparatus 1 extracts candidate lines in advance, based on only line segments that satisfy predetermined criteria. This enables a reduction in the processing load on the image processing apparatus 1 calculating the degree of overlap between the outline of each candidate region and the candidate lines, thus increasing the speed of the extraction.

(7) When either of two candidate regions arranged on the same straight line is determined to be a clip image, it is expected that the other candidate region is highly likely to be a candidate clip image. For this reason, the image processing apparatus 1 relaxes conditions for threshold values for the degree of overlap between the outline of each candidate region and the candidate lines, thus preventing missing extractions and improving the accuracy of extraction.

(8) The image processing apparatus 1 determines whether to select a candidate clip image as a clip image, based on tags (e.g., classifications or categories) for the candidate clip image. Thus, they can be used to determine whether an image in which a plurality of regions are joined is one image.

The above describes an embodiment of the present invention. However, the present invention is not limited to the above-described embodiment. The embodiment described enumerate merely the most preferable effects resulting from the present invention. Effects of the present invention are not limited to those described in the embodiment. The above-described embodiment and modifications thereof described below can be used together as appropriate, which is not described in detail herein.

(Modifications)

(1) This embodiment illustrates a rectangular region selected as a region containing an object from image data, but the region is not limited to be a rectangular region. For example, it may be a circular region or an elliptical region. In this embodiment, line segments included in the image data are selected as candidate lines. For a circular region or an elliptical region, circular arcs or elliptical arcs included in the image data may be selected as candidate lines. This allows circular photographs or elliptical photographs to be obtained as clip images.

Alternatively, as a region containing an object, a rectangular region, a circular region, and an elliptical region may be selected one after another for one piece of image data. This allows variously shaped images arranged in one image to be clipped.

(2) This embodiment illustrates processing of image data scanned from a brochure, but image data to be processed is not limited to this. The image data may be any image data that includes a plurality of images. For example, it may be image data obtained by scanning such as a comic, a newspaper, a thesis, or a general book. For a newspaper, this is effective, for example, in clipping only photographs or only advertisement regions. For a piece of paper in which a plurality of frames each including individual information are arranged, clip images are obtained more correctly.

(3) In this embodiment, an image processing apparatus is described as an apparatus that requests a tagging processing apparatus as a tagging engine to assign tags. However, the image processing apparatus is not limited to this, and may be the image processing apparatus 1 that has a tagging function.

REFERENCE SIGNS LIST

1 image processing apparatus
10 controller
11 image data obtainer
12 candidate region extractor
13 region-related processor
131 region area calculator
132 distortion determiner
133 distortion corrector
134 aspect ratio calculator
14 candidate region group generator
15 candidate line extractor
16 line-related processor
161 line corrector
162 line angle calculator
163 line angle determiner
17 candidate line group generator
18 overlap degree-related processor
181 overlap degree calculator
182 overlap degree determiner
19 clip image region extractor
20 tag obtainer
21 clip image determiner
30 storage unit
31*a* image processing program
32 image data storage unit
33 clip image data storage unit

The invention claimed is:

1. An image processing apparatus that extracts, from image data, a clip image included in the image data, the apparatus comprising:
at least one memory configured to store computer program code;
at least one processor configured to access said computer program code and operate as instructed by said computer program code, said computer program code including:
image data obtaining code configured to cause at least one of said at least one processor to obtain image data;
candidate region extraction code configured to cause at least one of said at least one processor to extract, as a candidate region, a region containing an object detectable from the image data;
candidate region group generation code configured to cause at least one of said at least one processor to generate a candidate region group, based on the candidate region extracted;
candidate line extraction code configured to cause at least one of said at least one processor to extract, as a candidate line, a line that is at least either a line segment or an arc included in the image data;
candidate line group generation code configured to cause at least one of said at least one processor to generate a candidate line group, based on the candidate line extracted;
overlap degree determination code configured to cause at least one of said at least one processor to determine a degree of overlap between a closed line forming an outline of the candidate region group generated and the candidate line group generated and determine whether the degree of overlap is greater than or equal to a preset predetermined first percentage value; and
clip image region extraction code configured to cause at least one of said at least one processor to extract the candidate region as a clip image, if the overlap degree determination code causes at least one of said at least one processor to determine that the degree of overlap is greater than or equal to the first percentage value,
wherein the candidate region is a rectangular region, and the candidate line is a line segment of a straight line.

2. The image processing apparatus according to claim 1, comprising region area calculation code configured to cause at least one of said at least one processor to calculate an area of the extracted region,
wherein if the area of the region calculated is greater than a preset first area value, the candidate region group generation code causes at least one of said at least one processor to exclude the region from the candidate region group.

3. The image processing apparatus according to claim 1, comprising line correction code configured to cause at least one of said at least one processor to correct a line width of the extracted line to a preset width,
wherein the candidate line group generation code is configured to cause at least one of said at least one processor to select the line corrected as the candidate line.

4. The image processing apparatus according to claim 1, comprising:
distortion determination code configured to cause at least one of said at least one processor to determine whether the outline of the extracted region is distorted; and
distortion correction code configured to cause at least one of said at least one processor to correct the outline of the region to a line segment, if the distortion determination code causes at least one of said at least one processor to determine that the outline of the region is distorted,
wherein the candidate region group generation code is configured to cause at least one of said at least one processor to select the region corrected as the candidate region.

5. The image processing apparatus according to claim 1, comprising aspect ratio calculation code configured to cause at least one of said at least one processor to calculate an aspect ratio that is a ratio of a length to a width of the extracted region,
wherein if the aspect ratio of the region calculated is greater than a preset value, the candidate region group generation code causes at least one of said at least one processor to exclude the region from the candidate region group.

6. The image processing apparatus according to claim 1 comprising line angle determination code configured to cause at least one of said at least one processor to determine whether an angle between the extracted line segment and a side of the candidate region is less than or equal to a preset first angle,
wherein if the line angle determination code causes at least one of said at least one processor to determined that the angle is less than or equal to the first angle, the candidate line group generation code causes at least one of said at least one processor to select the line segment as the candidate line.

7. The image processing apparatus according to claim 1, wherein when the clip image region extraction code has caused at least one of said at least one processor to extract, as the clip image, at least one of a plurality of the candidate regions each having one side located on the same straight line, the clip image region extraction code causes at least one of said at least one processor to extract, as the clip image, another candidate region except the candidate region extracted as the clip image, among the plurality of candidate regions, if degree of overlap between a closed line of the other candidate region and the candidate line included in the candidate line group generated is greater than or equal to a preset second percentage value less than the first percentage value.

8. The image processing apparatus according to claim 1, comprising:
 tag obtaining code configured to cause at least one of said at least one processor to obtain a tag assigned by a tagging processing apparatus to the clip image extracted, the tagging processing apparatus analyzing an image and assigning a tag to the analyzed image; and
 clip image determination code configured to cause at least one of said at least one processor to determine the clip image, based on the tag obtained.

9. An image processing method by which an image processing apparatus extracts, from image data, a clip image included in the image data, the method comprising:
 obtaining image data;
 extracting, as a candidate region, a region containing an object detectable from the image data;
 generating a candidate region group, based on the extracted candidate region;
 extracting, as a candidate line, a line that is at least either a line segment or an arc included in the image data;
 generating a candidate line group, based on the extracted candidate line;
 determining a degree of overlap between a closed line forming an outline of the generated candidate region group and the generated candidate line group and determining whether the degree of overlap is greater than or equal to a preset predetermined first percentage value; and
 extracting the candidate region as a clip image, if it is determined that the degree of overlap is greater than or equal to the first percentage value,
 wherein the candidate region is a rectangular region, and the candidate line is a line segment of a straight line.

10. A non-transitory computer readable medium storing an image processing program for causing a computer to function as an image processing apparatus that extracts, from image data, a clip image included in the image data, the program for causing the computer to:
 obtain image data;
 extract, as a candidate region, a region containing an object detectable from the image data;
 generate a candidate region group, based on the candidate region extracted;
 extract, as a candidate line, a line that is at least either a line segment or an arc included in the image data;
 generate a candidate line group, based on the candidate line extracted;
 determine a degree of overlap between a closed line forming an outline of the candidate region group generated and the candidate line group generated and determine whether the degree of overlap is greater than or equal to a preset predetermined first percentage value; and
 extract the candidate region as a clip image, upon determination that the degree of overlap is greater than or equal to the first percentage value,
 wherein the candidate region is a rectangular region, and the candidate line is a line segment of a straight line.

\* \* \* \* \*